Figure 1:
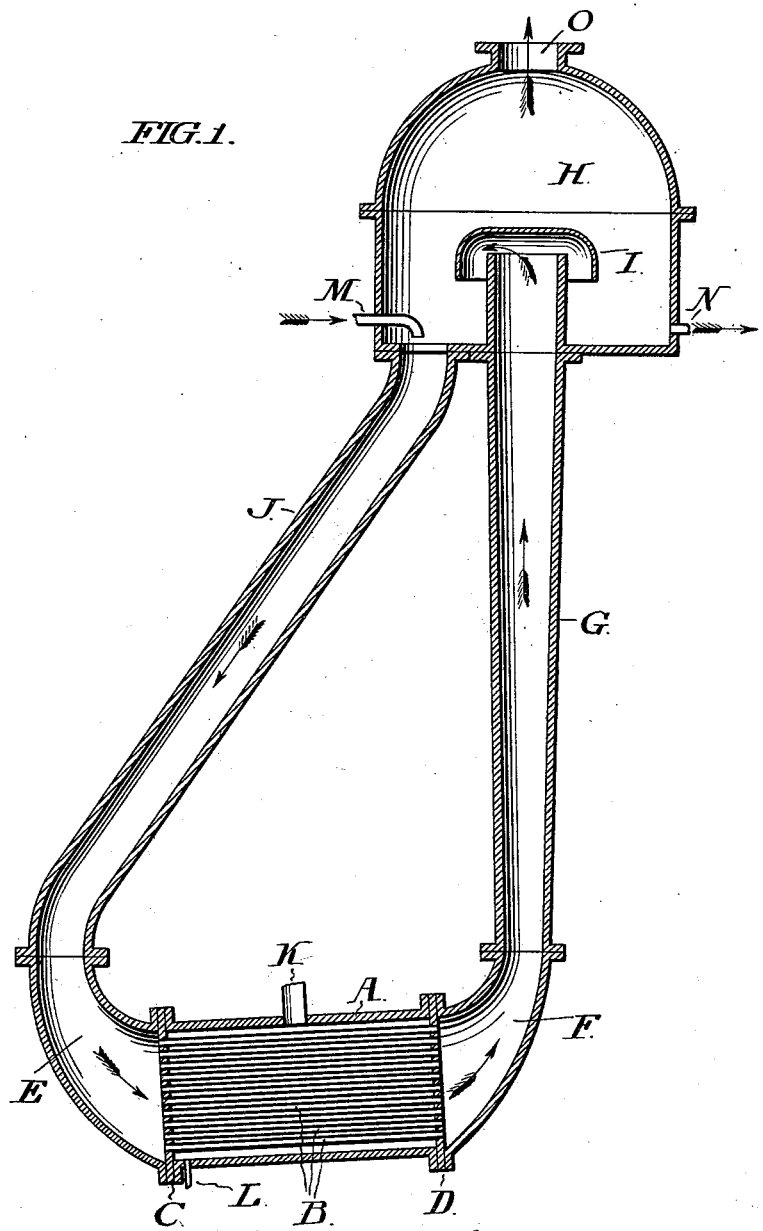

(No Model.)  3 Sheets—Sheet 1.

C. W. COOPER.
VACUUM PAN.

No. 521,974. Patented June 26, 1894.

WITNESSES:
N. E. Paige
F. Norman Dixon

INVENTOR
Charles W. Cooper
By his Attorneys
W. C. Strawbridge
Bonsall Taylor

THE NATIONAL LITHOGRAPHING COMPANY,
WASHINGTON, D. C.

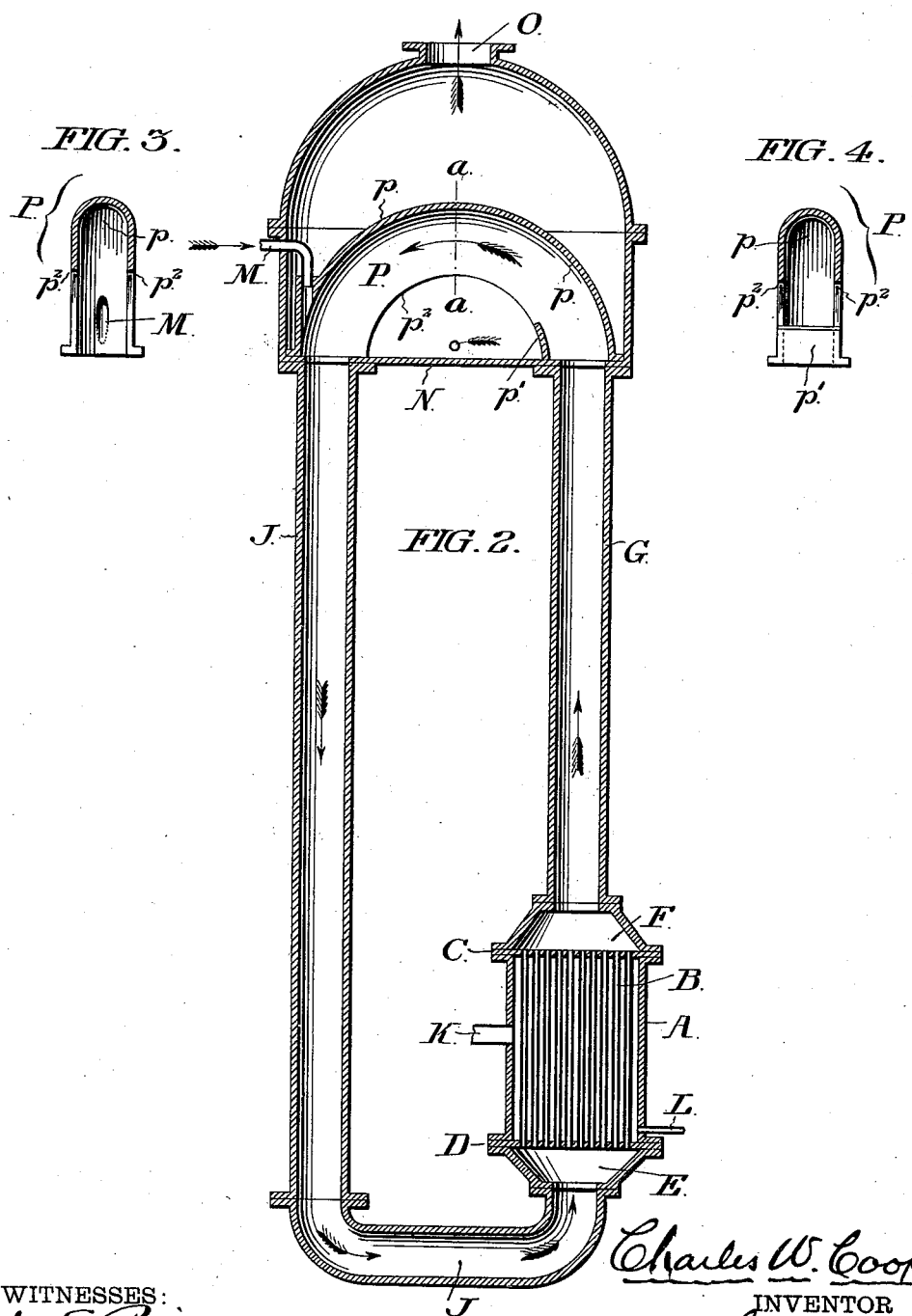

(No Model.) 3 Sheets—Sheet 3.

C. W. COOPER.
VACUUM PAN.

No. 521,974. Patented June 26, 1894.

WITNESSES:
F. Norman Dixon,
Mongomery Russell

Charles W. Cooper
INVENTOR
By his Attorneys
W. C. Strawbridge
J. Bonsall Taylor

UNITED STATES PATENT OFFICE.

CHARLES W. COOPER, OF NEW YORK, N. Y.

VACUUM-PAN.

SPECIFICATION forming part of Letters Patent No. 521,974, dated June 26, 1894.

Application filed April 4, 1893. Serial No. 469,044. (No model.)

*To all whom it may concern:*

Be it known that I, CHARLES W. COOPER, a citizen of the United States, residing in the city, county, and State of New York, have invented certain new and useful Improvements in Vacuum Apparatus for Evaporating Liquids, of which the following is a specification.

In the operation of evaporating liquids by boiling as heretofore conducted, nearly if not all of the evaporation has been due to the generation of vapor in the form of bubbles immediately upon the heating surfaces,—the bubbles during their formation, and until they are driven off, acting to exclude the unvaporized liquid from contact with said surfaces. As the rate of evaporation depends upon the rate at which heat is imparted to the liquid, and as this in turn depends upon the contact of the liquid with the heating surfaces, it follows that to such an extent as by the intervention of non-conducting bubbles is this contact prevented, to a corresponding extent will the efficiency of the heating surfaces for evaporation be impaired; while the greater the adhesion the bubbles have to the heating surfaces (other conditions being the same), the less will be the rate of evaporation. In certain evaporators in which a rapid scouring action of the liquid along the surfaces reduces the adhesion of the bubbles, better results have been secured, but even in evaporators of this class bubbles will form at the heating surfaces and militate against the efficiency of their operation.

The object of my invention is the production of an evaporator in which while the evaporation is occasioned by the transmission of heat to the liquid from heating surfaces as heretofore, the actual boiling or vaporization of the liquid is prevented to a great extent, or entirely, from taking place at the surfaces and, consequently, from forming bubbles upon them.

It is well known that the higher the pressure to which any liquid may be subjected, the higher will be the temperature required to cause it to boil. In order, therefore, to accomplish my object of preventing the boiling, and the consequent formation of bubbles from taking place at the heating surfaces, I so construct my apparatus that so long as the liquid is circulating in contact with the heating surfaces, it will be under such a pressure that, although it can absorb heat from said surfaces, it yet cannot boil; whereas, after it has in its circulation passed beyond these surfaces, the pressure upon it will become reduced, and vaporization due to the heat absorbed in the passage will then take place, with the result, that, the liquid then being beyond the heating surfaces, the bubbles caused by the vaporization, cannot form upon said surfaces and thereby impair the efficiency of the apparatus. The conversion of a portion of the liquid into vapor while under the lower pressure, reduces the temperature of the remainder, which in its circulation through my apparatus returns repeatedly to the heating surfaces; and, while under the higher pressure, in its passage absorbs more heat from said surfaces, which it again parts with in producing further evaporation when it again arrives under its lower pressure.

The alternate heating of the liquid while under the higher pressure at the heating surfaces, and its evaporation while under a lower pressure away from said surfaces, together with the rapid circulation produced, as hereinafter explained, by means of a heavy column of liquid without the admixture of vapor, in a downward channel of the circulation, and a lighter column mixed with vapor in an upward channel, both channels communicating with and extending upward from the heating surfaces to a vapor separating chamber, constitute the principal features of the invention.

My invention comprehends an evaporating apparatus of the character hereinafter described and claimed.

In the accompanying drawings I have represented three forms of apparatus alike embodying my improvements.

Figure 5:
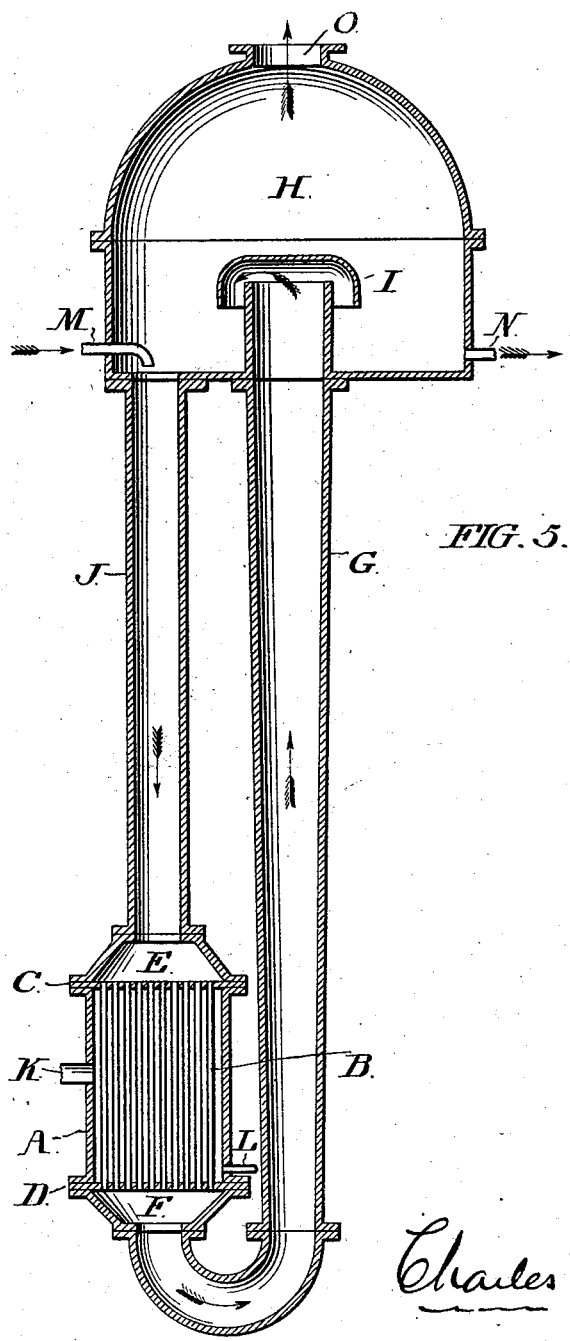

In the drawings, Figure 1 is a central, vertical, longitudinal, sectional, elevation, through a form of apparatus embodying my improvements, and which I find it convenient to employ. Fig. 2 is a similar view of a modified form of the same apparatus. Figs. 3 and 4 are central vertical side-sectional elevations on the dotted line *a—a* of Fig. 2,—Fig. 3 being viewed from the right hand side and Fig. 4 from the left hand side,—of the semi-circular channel P. Fig. 5 is a view similar to Figs. 1 and 2 of a further modification of my apparatus.

Similar letters of reference indicate corresponding parts.

A is a heating chamber containing the heating surfaces which in the embodiment represented are composed of a number of open-ended evaporating tubes B preferably disposed with a slight upward inclination from the horizontal. These tubes communicate, through tube heads C and D through which they tightly pass, respectively, with a tube-supply or inlet chamber E, and with a tube-discharge or outlet chamber F. From the outlet chamber F a pipe or discharge conduit G rises and enters a vapor or separating chamber H, where it is surmounted by a suitably formed and supported hood or deflector I. The discharged conduit G is preferably made to gradually enlarge as it ascends. From the lower portion of the separating chamber H a pipe or supply conduit J descends and communicates at the bottom with the tube-supply chamber E.

K is an inlet pipe to supply steam into the heating chamber A and around its tubes B. L a pipe for the discharge from said chamber of the water resulting from the condensation of the steam. M a liquid supply pipe for supplying the evaporator with the liquid to be evaporated.

N is a liquid discharge pipe (placed lower than the top orifice of the discharge conduit G) for discharging the concentrated liquid; and O is a vapor discharge pipe from the chamber H.

In the operation of an apparatus of the foregoing character, the liquid supplied through the liquid-supply pipe M circulates from the separating chamber H down the supply conduit J, through the inlet chamber E, heating tubes B, outlet chamber F, up the discharge conduit G into the separating chamber H again, and so on repeatedly. As the liquid descends the supply conduit J it has a temperature corresponding to the boiling point that is due to the pressure of vapor in the separating chamber H, but while passing through the heating tubes B it will have the weight of the column in the supply conduit J above it, and be under greater pressure than that of the chamber H. This greater pressure will cause the boiling point to be higher in the tubes B, and enable the liquid to absorb a certain amount of heat without boiling, so that if the column of liquid in the supply conduit J be high enough and large enough (proportionately to the amount of heating surfaces) to cause sufficient pressure in and circulation through the tubes B, the liquid will absorb all the heat that the tubes can impart to it without boiling before it emerges from them. As then the liquid ascends the discharge conduit G, the pressure upon it will become gradually reduced to the point where the heat absorbed by it while passing through the tubes B will cause it to commence boiling. The boiling will abstract heat from the liquid, but the higher the liquid rises the lower will be the temperature necessary to occasion further boiling, so that the boiling and reduction in temperature will continue, and the vapor first generated will be constantly added to as the pressure upon the commingled liquid and vapor becomes gradually reduced while they both ascend the conduit G, from the top of which they emerge as foam or spray reduced to the original temperature. This foam or spray is deflected downward by the hood I, the weight and momentum of the liquid carrying it to the bottom of the separating chamber H, and the vapor separating from it and passing upward and out through the vapor discharge pipe O. The liquid thus falling and depositing in the separating chamber H, is added to by the supply from the pipe M, and again descends the supply conduit J,—thereby continuously keeping up and repeating the circulation and evaporation just described. The excess of liquid supplied through the liquid supply pipe M over the amount that passes off as vapor, is discharged in its concentrated condition through the liquid discharge pipe N.

The object of inclining the heating tubes B upward from the tube supply chamber E is to insure at the start, or in case of resuming operations after a temporary stoppage, that any vapor that may be generated at first in the tubes will be prevented from ascending the supply conduit J, but will follow instead, the upward inclination toward the discharge conduit G, so that the circulation will under all circumstances start immediately in that direction. Other suitable means might be taken to so trap the vapor as to cause the circulation to always start immediately in the proper direction. The circulation having been started down the supply conduit J and up the discharge conduit G, the greater weight of the solid column of the liquid in the conduit J, over that of the column of commingled liquid and vapor in the conduit G, will cause the circulation to continue in the same direction.

The discharge conduit G is made smaller at the bottom and gradually larger as it ascends, to facilitate the carrying of the liquid upward by the vapor and to afford increased capacity as the volume of vapor in ascending increases. While preferable, I do not consider this enlargement necessary. It is not, moreover, essential to a rapid rate of evaporation that no vapor at all should be generated in the tubes, but the more nearly this condition is approached the more rapid will be the absorption of heat by the liquid in its passage through them. In order, therefore, to obtain the best results the supply conduit J should be high enough and large enough proportionately to the area of the heating surfaces, to occasion sufficient pressure and circulation through the tubes to prevent boiling in them, and the discharge conduit G should likewise be made of such proportions as will in combination with the supply conduit J, produce the co-action of circulation and pressure in the tubes B most conducive to this result.

Rapid circulation through the tubes of the cooler liquid from the supply conduit J, acts not only to prevent boiling in them, but also to quickly drive out whatever vapor may generate in them. The tubes B should therefore be relatively to their diameters not disproportionately long. It is, moreover, of the essence of the invention that the relative lengths of the heating chamber and its tubes upon the one hand, and of the supply conduit and the discharge conduit upon the other, should be so predetermined that the length of the heating tubes should in no instance be in excess of the length of the shorter of the two conduits referred to,—it being preferable that said tubes should be considerably shorter than either of the conduits, and bear some such proportion to said conduits as is indicated in the accompanying drawings.

Referring now to the modified form of apparatus illustrated by Figs. 2, 3, and 4, the evaporating tubes of the heating chamber A, as well as said chamber itself, are disposed and extended vertically from the inlet chamber E to the outlet chamber F, in line beneath the discharge conduit G, while the upper or exit end of said discharge conduit is connected with the upper or inlet end of the supply conduit J by means of an open semi-circular channel or deflecting gutter P, shown as U-shaped in cross-section with the inner or curved bottom $p$ of the U at its extremities connecting and coinciding, so to speak, with the bores of the conduits G and J, and as to its entire length facing inwardly and downwardly. $p'$ is a wall which wholly incloses the channel for some distance above the bottom of the separating chamber H. The part so inclosed by the wall $p'$ may be considered as an extension of the discharge conduit G. The open under side of the channel puts it in free communication with the main body of the separating or vapor chamber H, and through it with the vapor outlet O.

It being understood that the modified form of apparatus described operates in precisely the same manner as the apparatus of Fig. 1,—the operation of the channel will be readily understood. As the commingled liquid and vapor emerge from the conduit G, the momentum of the liquid causes it to fly to, and impinge upon, the inner or bottom part $p$ of the channel P, and to be guided by it directly into the mouth of the conduit J without loss of velocity. The vapor, in the mean time, separates from the liquid and, passing upwardly around the edges $p^2$ of the channel P discharges through the vapor outlet O. In this construction the liquid supply pipe M is preferably made to discharge directly into the channel P in the direction of the current as shown.

Either form of deflector heretofore described may be used in connection with either application of the heating chamber.

Referring now to the modified form of apparatus shown by Fig. 5, it will be observed that the heating chamber A and its heating tubes B, are disposed vertically in line beneath the supply conduit J, and that said conduit enters said chamber at the top, while the discharge conduit G leaves it from the bottom. Should it occur in this type of apparatus, that at the commencement of the operation and before circulation becomes established, vapor should be generated in the tubes B in such sufficient quantity as to create a current down the conduit G and up the conduit J, such current would soon be reversed and the circulation thereafter established and continued in the proper direction, for the following reasons:—If, at the beginning of the operation, there should be liquid in the apparatus, such liquid would stand at the same level in the discharge conduit G, and in the heating chamber B, or in the supply conduit J, as the case may be, and be no higher than the under opening of the liquid discharge pipe N. If the boiling should then commence in the evaporating tubes B, and at first carry the liquid up the supply conduit J, it would necessarily lower the level in the discharge conduit G which could receive no fresh supply of liquid, its top being above the level of the liquid in the separating chamber H, a level governed by the discharge pipe N. The lowering of the level of the liquid in the discharge conduit G would therefore continue until that conduit could supply no more liquid to the tubes, with the result that the liquid remaining therein would become so exhausted that the generation of vapor in the tubes would become insufficient to prevent the cooler liquid from the separating chamber H from falling down the supply conduit J. The liquid thus falling down said conduit would therefore drive downward whatever liquid and vapor remained in the tubes B, and cause it to ascend the conduit G. The current would thus be reversed, and inasmuch as the liquid entering the tubes at the top would be the cooler, and that emerging from them at the bottom would be the hotter, vapor would be generated during the ascent of the conduit G, and the circulation of the solid liquid caused to continue down the conduit J, and that of the commingled liquid and vapor up the conduit G as heretofore described in connection with the constructions heretofore described. In a word, it is by reason of the fact that the exit from the discharge conduit G is above the level of the liquid in the separating chamber H, and the entrance to the supply conduit J is below that level, that, when the apparatus is in full operation, the circulation can only be down the conduit J and up the conduit G, irrespective of the manner in which these pipes communicate with the heating chamber A.

In the foregoing description I have shown as the preferred heating surfaces, tubes inclosed in a steam chamber and arranged for the liquid to flow through them. The form of the heating surfaces through which the liquid is caused to circulate is not, however, of the essence of the invention; but upon the other hand, the descending supply conduit for conveying the cooler liquid from the separating chamber into the intervening heating chamber, and the ascending discharge conduit in which the liquid vaporizes while ascending from said heating chamber into said separating chamber, are essential to this invention.

In Letters Patent of the United States No. 482,340, granted to me September 13, 1892, for apparatus for evaporating liquids, is shown and described a conduit corresponding to the supply conduit J, descending from a vapor and separating chamber to a tube supply chamber corresponding to the inlet chamber E, and also a series of vertical tubes surrounded by steam in a steam chamber corresponding to the chamber A and constituting both the evaporating chamber and the upward return column or discharge conduit G. In the operation of my patented apparatus, however, the sudden conversion in each individual tube of some of the liquid into vapor, and its propulsion at great velocity up and out of the tubes, produce a recoil upon that liquid which is below, with the result that pulsations at intervals of a few seconds take place in each of the tubes, the evaporation taking place upon the inner surfaces of the individual tubes and forming at each interval between the pulsations, bubbles on said surfaces, which, however, are swept off at the next ensuing pulsation.

Although the evaporator of my former patent is the most efficient of any with which I have heretofore had experience, yet my present invention,—which comprehends the independent discharge conduit G in which evaporation takes place during the ascent of the liquid from the heating chamber A to the separating chamber H, and in which, the conduits and heating surfaces being properly proportioned, a continuous circulation of the liquid without the admixture of vapor is maintained through the heating tubes or along any other heating surfaces which the steam chamber A may contain,—while closely related to the former invention, is an improvement upon it.

The divisional arrangement described in the specification of the former invention is applicable also to my present apparatus, which, however, is peculiarly adapted for evaporation under vacuum for the reason that the less vapor tension there is in the separating chamber H the greater will be the difference in any given apparatus between the boiling temperature of that chamber and that of the heating tubes B, and consequently the greater will be the capacity of the liquid to absorb heat while passing through the tubes without boiling in them.

Having thus described my invention, I claim and desire to secure by Letters Patent—

1. A liquid-evaporating apparatus wherein are combined the following elements:—An upper vapor and liquid separating chamber,—a supply conduit leading out and down from the lower part of said separating chamber to a heating chamber,—a heating chamber embodying evaporating tubes or kindred heating surfaces of length not exceeding the length of either conduit with respect to which said chamber has communication, through or in contact with which the liquid is caused to pass and thereby subjected to the heat within the chamber,—and a discharge conduit leading from said heating chamber upward into said separating chamber, and having an outlet therein above the level of the inlet opening of the supply conduit,—substantially as and for the purposes set forth.

2. A liquid evaporating apparatus wherein are combined the following elements:—an upper vapor and liquid separating chamber,—a supply conduit leading out and down from the lower part of said separating chamber to a heating chamber,—a heating chamber embodying evaporating tubes or kindred heating surfaces of length not exceeding the length of either conduit with respect to which said chamber has communication, through or in contact with which the liquid is caused to pass and thereby subjected to the heat within the chamber,—a discharge conduit leading from said heating chamber upward into said separating chamber, and having an outlet therein above the level of the inlet opening of the supply conduit,—and a deflecting device within the separating chamber above the outlet of said discharge conduit,—substantially as and for the purposes set forth.

3. A liquid evaporating apparatus wherein are combined the following elements:—an upper vapor and liquid separating chamber,—a supply conduit leading out and down from the lower part of said separating chamber to a heating chamber,—a heating chamber embodying evaporating tubes or kindred heating surfaces of length not exceeding the length of either conduit with respect to which said chamber has communication, through or in contact with which the liquid is caused to pass and thereby subjected to the heat within the chamber,—a discharge conduit leading from said heating chamber upward into said separating chamber, and having an outlet therein above the level of the inlet opening of the supply conduit,—and a semi-circular channel, open as to its under surfaces and connecting the outlet of the discharge conduit with the inlet of the supply conduit,—substantially as and for the purposes set forth.

4. A liquid evaporating apparatus wherein are combined the following elements:—an upper vapor and liquid separating chamber, having a vapor discharge pipe or outlet,—a supply conduit leading downward from the lower part of said separating chamber,—a lower heating chamber of length not exceeding the length of either conduit with respect to which said chamber has communication, adapted to contain steam, and provided at its respective ends with tube heads between which a series of open-ended heating tubes are supported and tightly mounted, and also provided with an inlet chamber and an outlet chamber, a discharge conduit leading upwardly from said heating chamber to the separating chamber and having an outlet therein above the level of the inlet opening of the supply conduit,—and a deflecting device above the outlet of said discharge conduit,—substantially as and for the purposes set forth.

In testimony that I claim the foregoing as my invention I have hereunto signed my name this 28th day of March, A. D. 1893.

CHAS. W. COOPER.

In presence of—
   WM. H. WOODHULL,
   GEO. W. BUSTEED.